United States Patent
Geyer

Patent Number: 5,988,810
Date of Patent: Nov. 23, 1999

[54] SUPPORT FOR SPECTACLE GLASSES

[76] Inventor: Joachim Geyer, Dorfenerstrasse 8, D-85435 Erding, Germany

[21] Appl. No.: 09/122,951

[22] Filed: Jul. 27, 1998

[30] Foreign Application Priority Data

Jul. 29, 1997 [DE] Germany .......................... 197 32 667

[51] Int. Cl.⁶ ...................................................... G02C 1/02
[52] U.S. Cl. .............................................. 351/110; 351/41
[58] Field of Search ................................ 351/110, 41, 111, 351/140, 124, 158

[56] References Cited

U.S. PATENT DOCUMENTS

| | | | |
|---|---|---|---|
| 1,098,418 | 6/1914 | Wells. | |
| 1,278,190 | 9/1918 | Martin. | |
| 2,225,038 | 12/1940 | Diggins | 88/47 |
| 4,502,765 | 3/1985 | Cooper | 351/110 |
| 5,618,144 | 4/1997 | Leistner | 411/427 |
| 5,748,280 | 5/1998 | Herman | 351/110 |

FOREIGN PATENT DOCUMENTS

| | | |
|---|---|---|
| 379874 | 7/1985 | Austria. |
| 0601849 | 6/1994 | European Pat. Off.. |
| 0661575 | 7/1995 | European Pat. Off.. |
| 0666490A1 | 9/1995 | European Pat. Off.. |
| 1816959 | 7/1960 | Germany. |
| 2641177 | 3/1978 | Germany. |
| 9015749 | 4/1991 | Germany. |
| 7218871 | 8/1995 | Japan. |
| 8015651 | 1/1996 | Japan. |
| 8054582 | 2/1996 | Japan. |
| 8278471 | 10/1996 | Japan. |
| 236492 | 7/1925 | United Kingdom. |
| 9633438 | 10/1996 | WIPO. |
| 9721133 | 6/1997 | WIPO. |

*Primary Examiner*—Hung Xuan Dang
*Attorney, Agent, or Firm*—Rankin, Hill, Porter & Clark LLP

[57] ABSTRACT

A lens mount for eyeglasses lenses is provided with at least one bite means as an engagement means to permit locating the lenses relative to the lens mount and thus relative to a temple and/or bridge engaging in turn the lens mount. The bite means positively engage the surface of the lenses such that any twisting of the lenses relative to the lens mount is prevented. In a preferred embodiment the lens mount is configured as a bolt/nut design, the bite means being configured as protuberances on the underside of a bolt head opposing the lens.

24 Claims, 4 Drawing Sheets

SUPPORT FOR SPECTACLE GLASSES

TECHNICAL FIELD AND BACKGROUND OF THE INVENTION

The present invention relates to a lens mount for frameless eyeglasses.

Various lens mounts for frameless eyeglasses are known from prior art as briefly discussed in the following, all of which have in common that the design is complex, the components of which are complicated in production and prone to faults in assembly.

Thus, for example, an arrangement is known in which a pair of bolts is provided at the edge of an eyeglasses lens in the region of the temple, both of which penetrate the lens and are joined in common to the temple via one or two bridging members, the intention of the arrangement of the two bolts spaced away from each other to locate the lens by means of a corresponding nut being to prevent twisting of the temple relative to the lens.

Although another known mount for an eyeglasses lens comprises only one bolt penetrating the lens in its edge region and is likewise located by means of a nut, a notch is ground into the edge of the lens to safeguard against twisting. Inserted fitted in this notch is a locking pin which the same as the bolt is fixedly connected to the temple. By this arrangement of bolt and locking pin the lens is held in place at two points relative to the temple to prevent twisting of the lens.

Accordingly, solutions thus read from prior art which although they prevent twisting of the lens relative to the temple they necessitate, however, precise positioning in production and assembly by the arrangement of at least two locating points. The configuration of known arrangements involves multiple parts and is thus expensive in production.

SUMMARY OF THE INVENTION

As compared to this it is the object of the invention to define a simple eyeglasses lens mount requiring only a single fastening point to be provided whilst nevertheless assuring high resistance to twisting of the lens relative to the temple and/or bridge.

This object is achieved by an eyeglasses lens mount including an engagement means producing a positive connection to an eyeglasses lens locating it resistant to twisting, said engagement means incising the surface of the lens.

This achievement thus produces a positive engagement between the lens mount and the lens by very simple ways and means without requiring additional components.

In one preferred embodiment the lens mount is characterized by at least one bite means being provided as the engagement means at the lens mount. This embodiment including one or more bite means is particularly simple and thus cost-effective in production. Providing several bite means enhances the resistance to any (twisting) force presented from without by the bites, i.e. the engaging elements between the lens and the lens mount.

In another preferred embodiment the lens mount consists substantially of a bolt and a nut. By this configuration the force needed to produce the engagement may be simply applied or produced by utilizing the leverage of the screw thread between the bolt and the nut.

Once the engagement or bite means has been brought into positive engagement with the lens, for which a linear movement of the engagement elements or bite elements is sufficient, the bolt is inserted into a hole drilled through the lens with the bite means configured on the side of the bolt head facing the lens so that tightening the nut causes the bolt to be urged into full contact with the lens as a result of which the bite means incises or bites into the surface of the lens.

To accommodate eyeglasses lenses differing in thickness or also lenses having a changing thickness the lens mount in accordance with the invention comprises furthermore a shim on the nut side, this shim featuring a changing thickness cross-section to compensate for changes in thickness of the lens.

The moment of resistance presented by the lens mount against any (twisting) force applied from without is highest when the engagement or bite means is provided on the periphery of the lens mount, the leverage between the fulcrum or application point of the lens mount, and the engagement or bite means forming the counterhold by engaging the lens, then being a maximum.

To minimize harm to the lens it is sufficient when the engagement or bite means features a height extent of approximately $2/10$ mm.

The lens mount is made preferably of V2A grade steel to achieve adequate strength and elasticity.

Fitting the temples and/or bridge to the lens mount in accordance with the invention is done either by soldering or screwing.

In a further preferred eyeglasses lens mount the engagement means is provided preferably as a polygonal protuberance producing a positive engagement between the lens and the lens mount, a corresponding recess being provided in the surface of the lens.

The shape of the aforementioned protuberance must not necessarily be polygonal, it may be of any shape suitable to prevent twisting between the lens mount and the lens, i.e. also approximately oval, trapezoidal, etc.

BRIEF DESCRIPTION OF THE DRAWINGS

The scope of protection reads from the corresponding claims, for the better understanding of which as regards the present invention a few embodiments will now be described with reference to the drawings in which:

DETAILED DESCRIPTION

Figure 1:
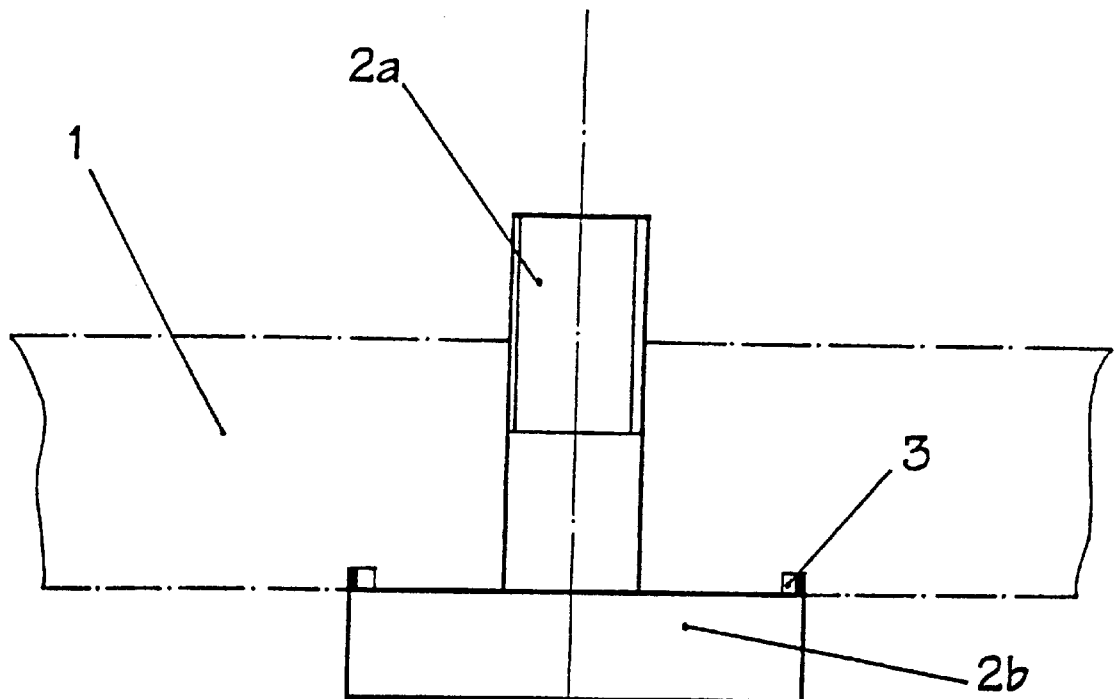
FIG. 1 is a schematic partial cross-sectional view of an eyeglasses lens mount in accordance with the invention illustrated greatly magnified taken along the line A as shown in FIG. 2.

Referring now to FIG. 1 there is illustrated schematically a section of an eyeglasses lens 1 made of a tough, pliant plastics material as available on the market since recently. Not shown in FIG. 1 is a temple and/or bridge as provided for wearing such eyeglasses, although such a temple/bridge is secured to the lens mount 2 by usual ways and means, it being, for example, soldered to the flat underside of the lens mount 2 as shown in FIG. 1.

The eyeglasses lens mount 2 in accordance with the invention serves to connect the lens 1 by as few fastener points as possible to the bridge or temples as necessary, for example, for frameless plastics lenses. In the example embodiment shown only a single lens mount 2 is provided to produce the connection between the lens 1 and the temple and/or bridge. To achieve a high resistance to twisting between the lens 1 and the temple and/or bridge the following means are provided in accordance with the present invention.

On the side facing the eyeglasses lens 1 one or more bite means 3 (engagement means) engaging the lens 1 are provided on the lens mount 2 configured in the example embodiment as a bolt. The lens mount 2 configured as a bolt comprises a bolt head 2b as well as a cylindrical bolt shank incorporating a screw thread 2a (male thread). As evident from FIG. 2 the bolt head 2b is configured straight at the two opposing upper and lower side sections and circular segment-shaped at the two left and right side sections. Arranged in the region of the two circular segment-shaped side sections are the bite means 3 extending upwards along the circumferential edge (FIG. 1).

When, in the example embodiment as shown, the lens mount 2 is inserted into a hole drilled in the lens 1 the bite means 3 come into contact with the surface of the lens 1 by their free edges. When then a nut (not shown in FIGS. 1 and 2) is screwed onto the screw thread 2a, including a shim where necessary, a tensile force is exerted on the bolt head 2b once the nut has come into contact with the surface of the lens 1. Due to this tensile force the bite means 2 are caused to incise or bite into the surface of the lens 1 until the bolt head 2b is in full contact with the lens 1.

To prevent the bolt head 2b from turning when tightening the nut it is good practice to lock the bolt head either by means of a suitable tool or by a jig specially adapted to the shape of the bolt head 2b.

The height H (see FIG. 4) of the bite means 3 preferably amounts to 2/10 mm but may also be configured more or less than this, depending on the properties of the plastics material used for the lens 1.

Figure 2:
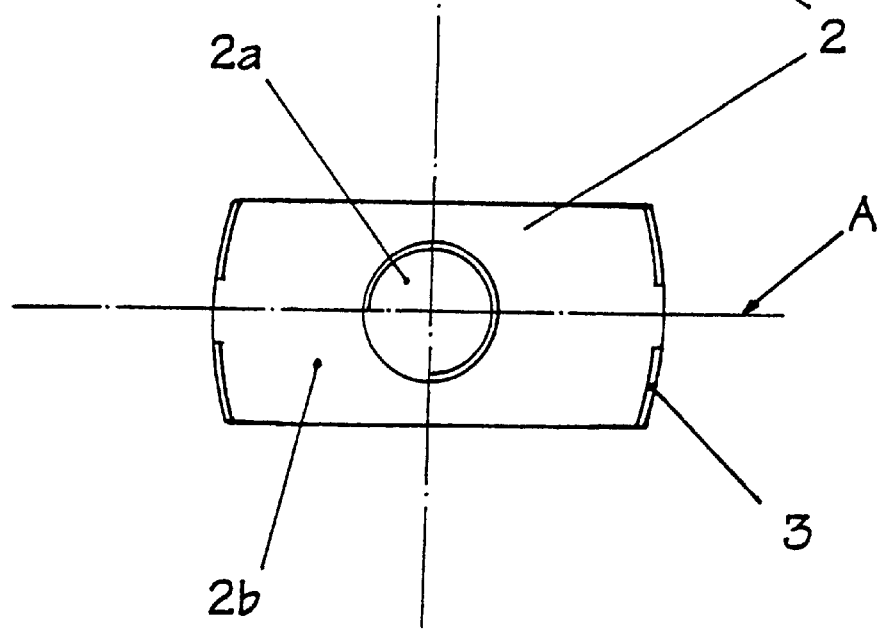
FIG. 2 is a plan view of the lens mount as viewed from the bite means side.

Referring now to FIG. 2 there is illustrated a four-part bite means 2, the cross-section of which is configured substantially constant.

Since the number and shape of the engagement or bite means 2 are dictated ultimately by the function, other forms of the engagement or bite means 3 may also be provided. The factor decisively influencing the shape and number of the engagement or bite means 3 is that the engagement or bite means 3 lightly bite or work their way into the plastics material of the lens 1 and subsequently present a high resistance to any twisting of the lens mount 2. As an alternative to the bite action in producing the positive connection heat treatment is also conceivable in achieving shaping in the region of the lens mount by brief, localized heating to ultimately achieve a positive connection between the plastics glass and the lens mount.

The bite means 3 preferably employed are configured four-part in the example embodiment as shown in FIG. 2 so that several biting edges materialize facilitating the bite into the plastics material when the nut is tightened.

Figure 3:
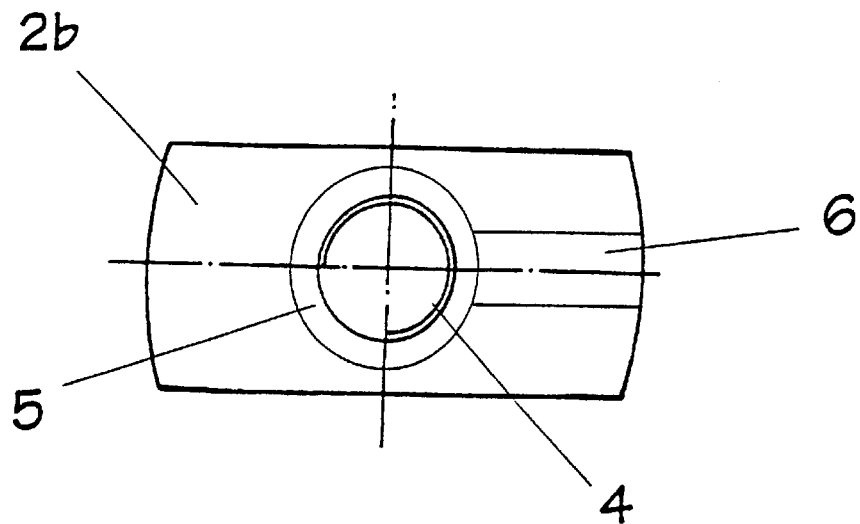
FIG. 3 is a further plan view of the lens mount as viewed from the bolt head side.

As already mentioned above, a temple and/or bridge may be soldered to the flat underside of the lens mount 2. Referring now to FIG. 3 there is illustrated a further embodiment of the eyeglasses lens mount 2 in accordance with the invention in which a temple and/or bridge may be fitted to the lens mount 2 by means of a further bolt connection.

For this purpose a circular recess 5 (blind hole) is provided in the side of the bolt head 2b facing away from the screw thread 2a, a further blind hole smaller in diameter and having a female thread 4 being arranged in turn in the recess 5. An elongated groove 6 provides a recess in which a longitudinal section of a temple and/or bridge can be inserted such that an eyelet (not shown) provided at the end of the temple and/or bridge may be inserted into the circular recess 5. It is through this eyelet on the temple and/or bridge that a bolt (not shown) is screwed into the thread 4 to achieve a lock between the lens mount 2 and the temple and/or bridge.

Depending on the shape of the temple and/or bridge other shapes of the recess 5 and of the groove 6 in the bolt head 2b of the lens mount 2 may also be provided.

Figure 5:
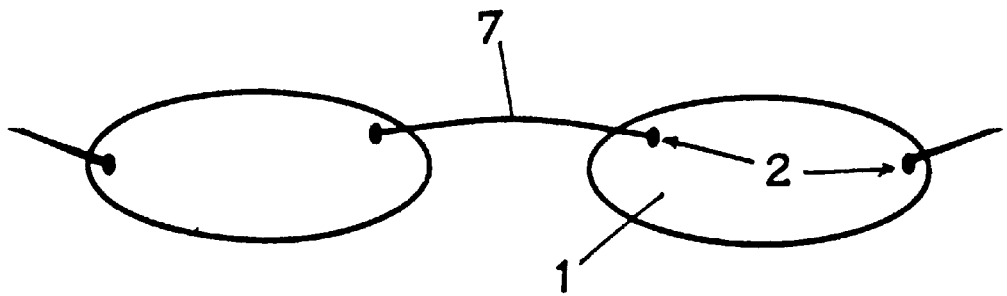
FIG. 5 is a schematic view of an eyeglasses including a lens mount 2 in accordance with the invention.

Referring now to FIG. 5 it is evident that the eyeglasses lens mount 2 in accordance with the invention as compared to normal size eyeglasses lenses 1 is exceptionally small, i.e. the diameter or the longitudinal and transverse extent of the bolt head 2b amounts to approximately 4 to 6 mm whilst the screw thread 2a has a diameter of approximately 2 mm. A bridge 7 as provided as the connecting element between the two eyeglasses lenses 1 is fixed to the side of the bolt head 2b of the lens mount 2, the temples being likewise secured to the side lens mounts 2 provided therefor. By the bite means 2 in accordance with the invention at the underside of the bolt head 2b a twist-resistant securement of the temples and bridge relative to the lens 1 is defined at but one fastening point by means of the lens mounts 2.

Since the eyeglasses lenses 1 are to be provided to correct defective vision, greatly varying from one person to another, lenses may also be utilized which differ in thickness. This change in thickness, as evident from FIG. 6, may be compensated by a shim 9 configured correspondingly. To ensure full contact of the bolt head 2b of the lens mount 2 with the side of the bite means 2 on the lens 1 a shim 9 is inserted on the side of the nut 8, the thickness of the shim likewise varying accordingly.

Figure 4:
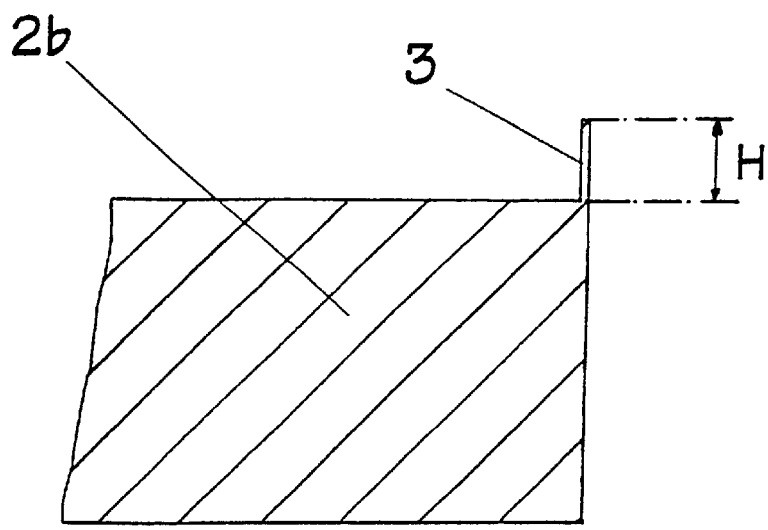
FIG. 4 is a further schematic depiction of the lens mount bite means illustrated greatly magnified.
Figure 6:
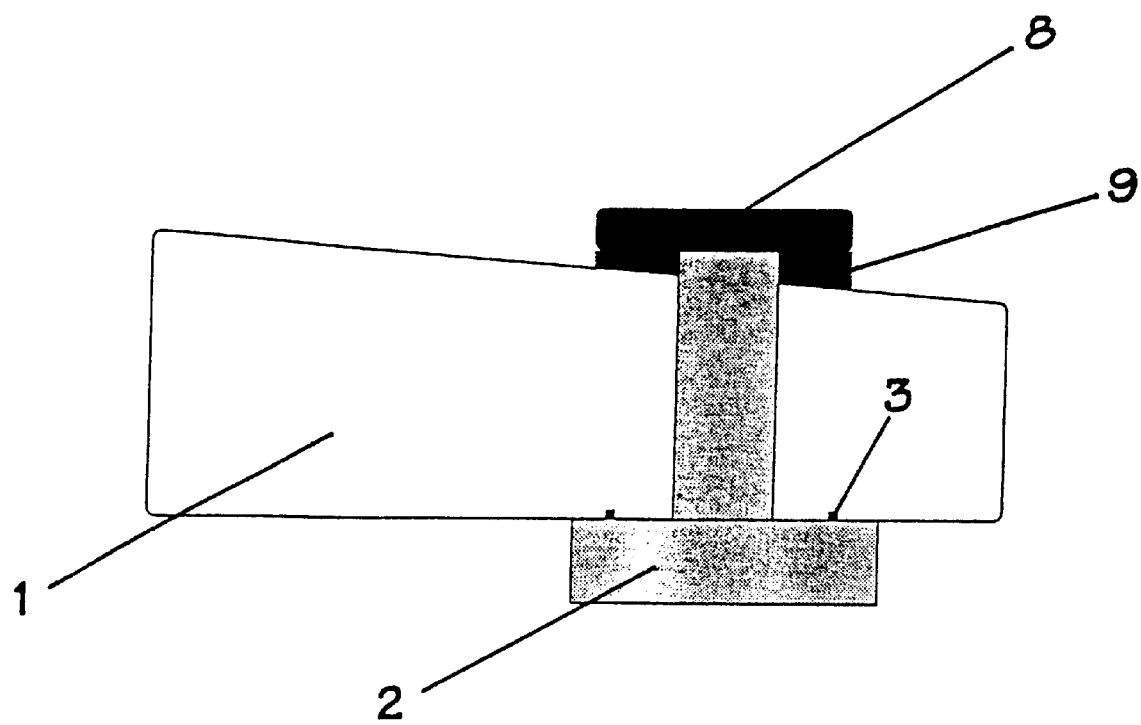
FIG. 6 is a schematic cross-sectional view of a lens mount 2 for a lens 1 having a changing thickness.

As also evident from FIG. 6 it is not necessary that the bite means 3 are arranged on the circumferential edge of the bolt head 2b as shown in FIGS. 1, 2 and 4, instead the bite means 3 may also be arranged in the inner portion of the bolt head 2b, i.e. spaced away from the circumference.

In conclusion the lens mount 2 is fabricated preferably of a high-strength material, such as, for instance, V2A grade steel. however, other materials are just as conceivable for the lens mount 2 as long as they feature the necessary strength properties and permit shaping or configuring of the engagement or bite means 3 in accordance with the invention.

In the example embodiments as shown a bolt/nut-type fastener is provided as the lens mount 2, however, other arrangements are just as possible, comprising at least one component mounting the bite means 3 and which are defined on the lens 1 so that a high resistance to twisting is assured. To be cited in this respect is, for example, a type of rivetted structure, the engagement or bite means 3 then needing to be arranged on the underside of the rivert head.

The second embodiment of the present invention will now be described with reference to FIG. 7.

Here, 10 identifies an eyeglasses lens comprising a hole 11 therethrough, this hole 11 being penetrated by the shank of a bolt 12 having preferably a flat and smooth bolt head incorporating a stepped side arranged in the embodiment as shown on the side of the lens 10 and featuring a disk 14 arranged inbetween. The step 12a is able to engage a corresponding recess in the disk 14. At the side of the disk 14 opposing the lens 10 bite means 13 are provided configured similar to those of the first embodiment to achieve resistance to twisting.

Figure 7:
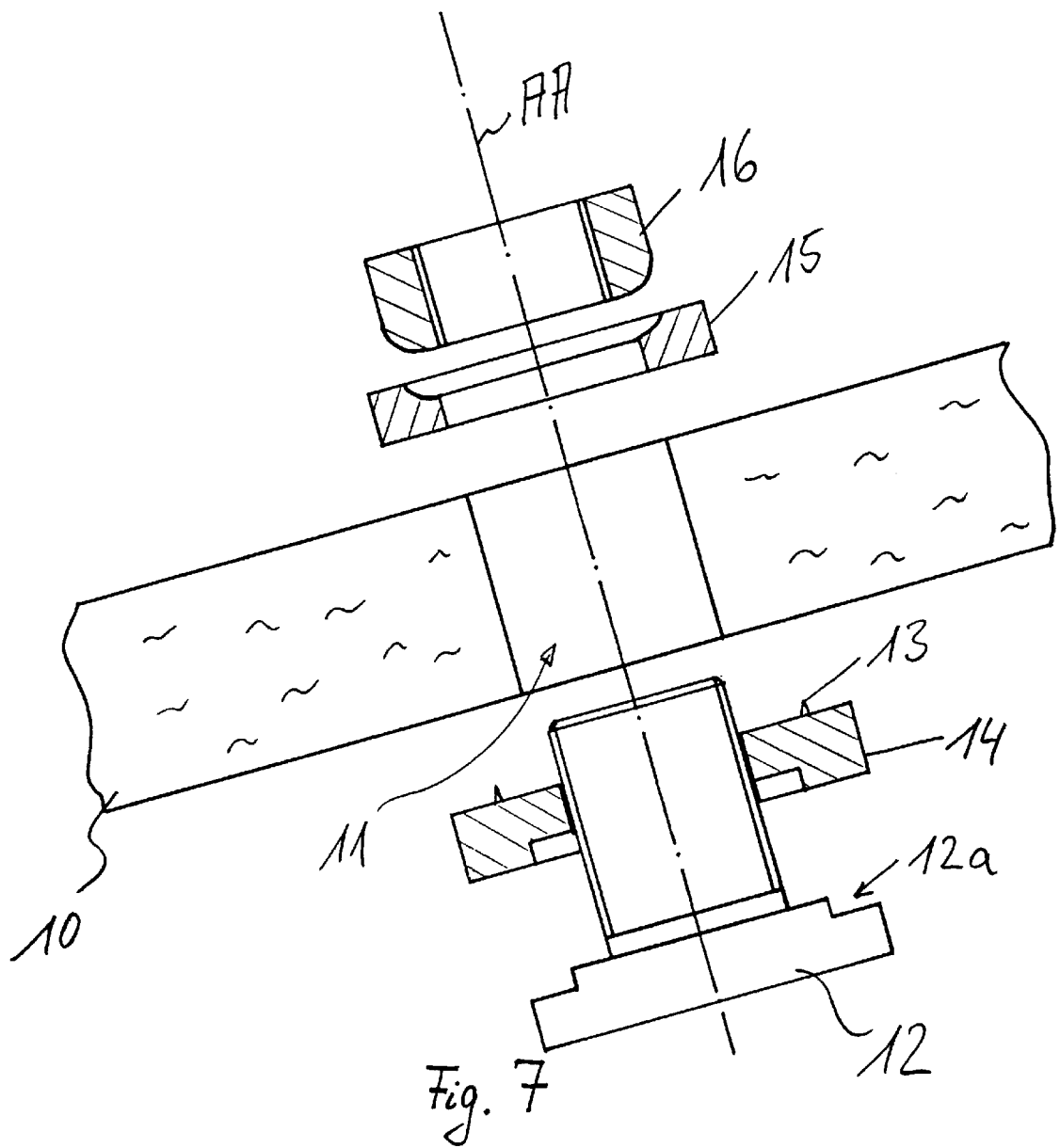
FIG. 7 is a cross-sectional illustration of a second embodiment in accordance with the present invention.

Provided on the other side of the lens 10, above the lens 10 as evident from FIG. 7, are a further disk 15 and a nut 16. To achieve angle compensation when there is a change in the thickness of the lens 10 a contact surface area is configured on opposing surface areas of the nut 16 and the disk 15, this contact surface area being substantially spherical and permitting the components 12, 14, 15 and 16 to be automatically aligned along the axis AA and relative to the lens 10 when the bolt connection is tightened.

The step 12a of the bolt 12 and the corresponding recess in the disk 14 are preferably configured polygonal as viewed from above (not shown) to produce a positive connection between these two components so that any relative twisting of the two components about the axis AA is prevented.

A further embodiment of the present invention (not shown) is characterized by the engagement means being provided as a polygonal protuberance producing a positive engagement between the lens and the lens mount, the corresponding recess in the surface of the lens being provided, for instance, by milling.

The shape of this protuberance must not necessarily be polygonal, however, any shape being possible to prevent twisting between the lens mount and the lens, i.e. it possibly being ellipsoidal, trapezoidal, etc.

When, for instance, the bolt head 2b as shown in FIG. 2 is inserted as a whole into a recess formed out of the shape of the bolt head 2b in the lens 1 this likewise achieves a resistance to twisting of the lens mount 2 relative to the lens 1.

A lens mount for eyeglasses lenses is accordingly provided with at least one engagement means (e.g. a bite means or a protuberance) to enable the lenses to be located relative to the lens mount and thus relative to a temple and/or bridge engaging in turn the lens mount. The engagement means engages the surface of the lenses such that any twisting of the lenses relative to the lens mount is prevented. In a preferred embodiment the lens mount is configured as a bolt/nut design, the bite means e.g. being configured as sharp-edges protuberances on the underside of a bolt head, opposing the lens mount.

What is claimed is:

1. An eyeglasses lens mount including an engagement means producing a positive connection for locating an eyeglasses lens resistant to twisting wherein said engagement means incises the surface of said lens.

2. The eyeglasses lens mount as set forth in claim 1 wherein said engagement means is configured by at least one bite means.

3. The eyeglasses lens mount as set forth in claim 2 wherein said lens mount consists substantially of a bolt and a nut.

4. The eyeglasses lens mount as set forth in claim 3 wherein said bolt is inserted in a hole through said lens, a bite means being provided on the side of a bolt head of said bolt facing said lens.

5. The eyeglasses lens mount as set forth in claim 4 wherein furthermore a shim is provided on the side of said nut.

6. The eyeglasses lens mount as set forth in claim 5 wherein said shim comprises a changing thickness cross-section.

7. The eyeglasses lens mount as set forth in claim 3 wherein a disk is arranged between said bolt and said lens, said engagement means being configured on said disk, as well as a further disk being arranged between a nut and said lens.

8. The eyeglasses lens mount as set forth in claim 7 wherein the opposing surface areas of said bolt and said disk are configured stepped and comprise a polygonal cross-section producing a positive connection between said bolt and said disk.

9. The eyeglasses lens mount as set forth in claim 7 wherein the opposing surface areas of said nut and said disk are configured spherical at least in part.

10. The eyeglasses lens mount as set forth in claim 2 wherein said engagement means comprise a height extent of approximately 2/10 mm.

11. The eyeglasses lens mount as set forth in claim 1 wherein said lens mount consists substantially of a bolt and a nut.

12. The eyeglasses lens mount as set forth in claim 11 wherein said bolt is inserted in a hole through said lens, a bite means being provided on the side of a bolt head of said bolt facing said lens.

13. The eyeglasses lens mount as set forth in claim 12 wherein a temple and/or bridge is secured to said bolt head either by soldering or by screwing to a thread.

14. The eyeglasses lens mount as set forth in claim 11 wherein furthermore a shim is provided on the side of said nut.

15. The eyeglasses lens mount as set forth in claim 14 wherein said shim comprises a changing thickness cross-section.

16. The eyeglasses lens mount as set forth in claim 15 wherein said engagement means is provided at the periphery of said lens mount.

17. The eyeglasses lens mount as set forth in claim 11 wherein a disk is arranged between said bolt and said lens, said engagement means being configured on said disk, as well as a further disk being arranged between a nut and said lens.

18. The eyeglasses lens mount as set forth in claim 17 wherein the opposing surface areas of said bolt and said disk are configured stepped and comprise a polygonal cross-section producing a positive connection between said bolt and said disk.

19. The eyeglasses lens mount as set forth in claim 17 wherein the opposing surface areas of said nut and said disk are configured spherical at least in part.

20. The eyeglasses lens mount as set forth in claim 1 wherein said engagement means is provided at the periphery of said lens mount.

21. The eyeglasses lens mount as set forth in claim 1 wherein said engagement means comprise a height extent of approximately 2/10 mm.

22. The eyeglasses lens mount as set forth in claim 1 wherein said lens mount is made preferably of a V2A grade steel.

23. The eyeglasses lens mount as set forth in claim 22 wherein a temple and/or bridge is secured to said bolt head either by soldering or by screwing to a thread.

24. The eyeglasses lens mount as set forth in claim 1 wherein said engagement means comprises preferably a polygonal protuberance producing a positive engagement between said lens and said lens mount, a recess corresponding to the shape of said protuberance being provided in the surface of said lens.

* * * * *